United States Patent [19]
Kohl et al.

[11] Patent Number: 5,594,321
[45] Date of Patent: Jan. 14, 1997

[54] BATTERY CHARGING APPARATUS WITH FAULT DETECTION

[75] Inventors: Walter Kohl, Bietigheim-Bissingen; Rainer Mittag, Kornwestheim; Matthias Hoeber, Stuttgart, all of Germany

[73] Assignee: Robert Bosch GmbH, Stuttgart, Germany

[21] Appl. No.: 273,225

[22] Filed: Jul. 11, 1994

[30] Foreign Application Priority Data

Aug. 16, 1993 [DE] Germany ............... 43 27 484.6

[51] Int. Cl.⁶ .................................................. H02J 7/24
[52] U.S. Cl. ........................... 320/48; 320/61; 322/99
[58] Field of Search .................................. 320/28, 43, 47, 320/49, 48, 61, 64; 322/98, 99; 361/18, 153, 187, 33, 23

[56] References Cited

U.S. PATENT DOCUMENTS

| | | | |
|---|---|---|---|
| 4,315,205 | 2/1982 | Mori et al. | 322/99 |
| 4,316,134 | 2/1982 | Balan et al. | 322/99 |
| 4,413,222 | 11/1983 | Gansert et al. | 320/48 |
| 4,451,774 | 5/1984 | Akita et al. | 320/48 X |
| 5,166,594 | 11/1992 | Schramm et al. | 320/28 |

FOREIGN PATENT DOCUMENTS

| | | |
|---|---|---|
| 0192832 | 9/1986 | European Pat. Off. |
| 1252076 | 11/1971 | United Kingdom. |
| 1603886 | 12/1981 | United Kingdom. |
| 2100076 | 12/1982 | United Kingdom. |
| 8103403 | 11/1981 | WIPO. |

*Primary Examiner*—Edward H. Tso
*Attorney, Agent, or Firm*—Michael J. Striker

[57] ABSTRACT

The battery charging apparatus includes a generator, main voltage regulator, an auxiliary voltage regulator, at least one consuming device and a protective circuit having circuit portions for recognizing and signalling faults via a charge control lamp. The generator output voltage is rectified with rectifier bridges containing Zener diodes. Voltage comparison to threshold values and logic circuitry for processing the comparison results are used to determine the presence of faults in the operation of the battery charging apparatus. The fault detection device detects conduction defects in the main voltage regulator and/or interruption in the generator excitation circuit. The logic circuitry determines whether simultaneously both a supplied voltage exceeds a threshold value and the main voltage regulator is turned on longer than a predetermined time interval to indicate its continuous operation. After a fault is detected voltage regulation is performed by the auxiliary voltage regulator until the fault is eliminated so that the rectifier bridges are not destroyed. The battery charging apparatus described is particularly suitable for use in motor vehicles.

6 Claims, 4 Drawing Sheets

FIG.3a-1
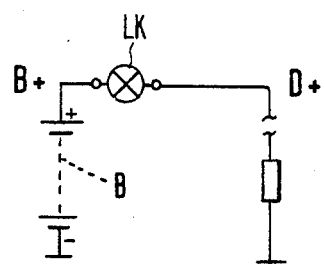
FIG.3a-2
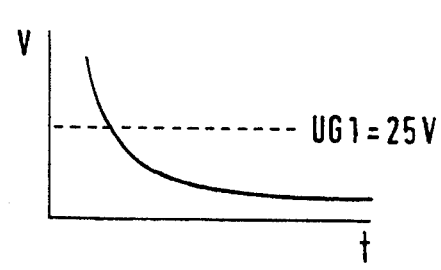
FIG.3b-1
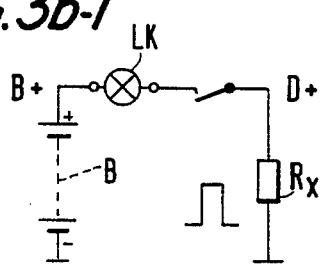
FIG.3b-2
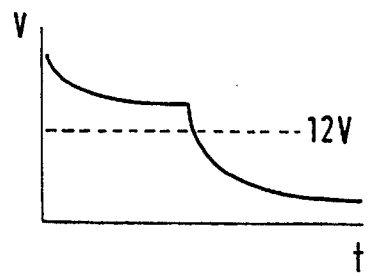
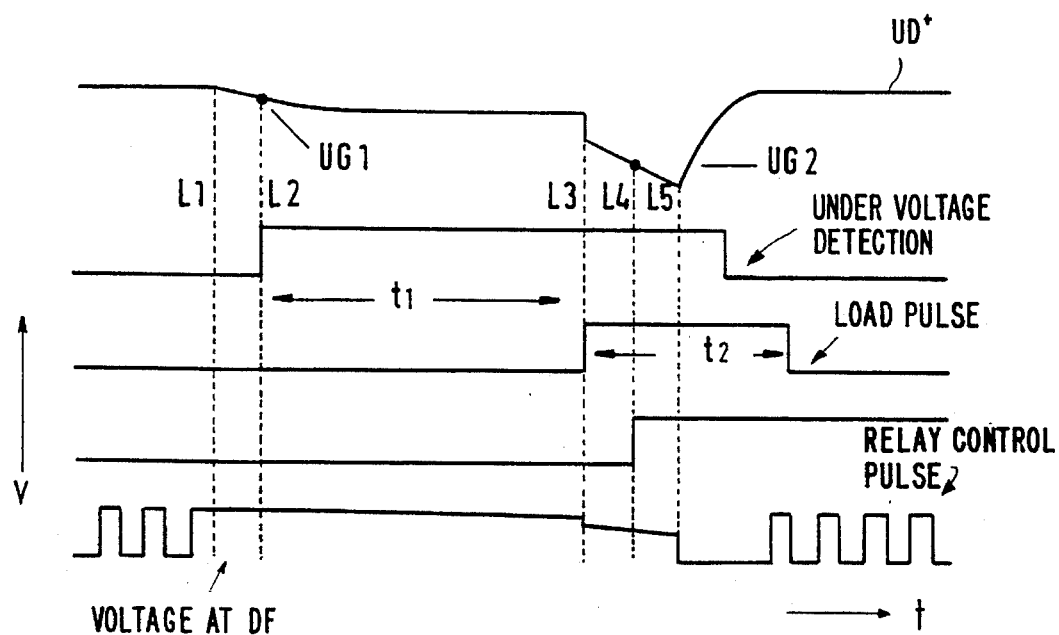
FIG.3c

BATTERY CHARGING APPARATUS WITH FAULT DETECTION

BACKGROUND OF THE INVENTION

The present invention relates to a battery charging apparatus and, more particularly, to a battery charging apparatus for a motor vehicle.

A battery charging apparatus for a motor vehicle is known comprising a generator having rectifier means, two terminals for at least one battery to be charged, a terminal for at least one consuming device, main voltage regulator means for control of the generator output voltage, means for fault detection, means for fault indication via a charge control lamp and means for protection of the battery charging apparatus from overvoltages.

A battery charging system, in which the occurrence of a single possible fault is indicated or signalled and which can switch to an emergency operation condition in case the fault is detected, for example to an emergency regulation, is already known. For example a battery charging system is described in German Published Patent Application 38 44 442 and/or the related U.S. Pat. No. 5,166,594, in which the battery to be charged is supplied by an alternator, in which a semiconductor-voltage regulator is used to keep the generator output voltage constant.

The operator of the battery charging system is warned promptly by a charge control device, when a fault occurs inside the battery charging system. Simultaneously emergency regulation occurs by means of a separate auxiliary voltage regulator.

The known battery charging system is used in connection with a generator and an associated rectifier bridge, which invariably includes diodes. This fault detection and/or emergency regulation in contrast cannot be used with a rectifier bridge having at least three Zener diodes.

SUMMARY OF THE INVENTION

It is an object of the present invention to provide an improved battery charging apparatus with fault detection.

This object and others which will be made more apparent hereinafter are attained in a battery charging apparatus comprising a generator having a connected rectifier system, two terminals for at least one battery to be charged, a terminal for at least one consuming device, voltage regulator means for control of the generator output voltage, means for fault detection, means for fault indication including a charge control lamp and means for protection of the battery charging apparatus from overvoltages.

According to the present invention, the means for fault detection includes means for comparing a voltage to a voltage threshold value to produce a comparison result indicating when this voltage exceeds the voltage threshold value and logic circuit means including logic circuit components to signal a fault has occurred only when the voltage exceeds the voltage threshold value.

When a fault is recognized the battery charging apparatus is switched to an emergency regulation, which is accomplished with the help of a complete auxiliary or additional voltage regulator means. This happens in a particularly advantageous manner when a conduction defect occurs in the main regulator or an interruption of the regulator circuit of the generator is detected. Thus it can be guaranteed that the Zener diodes of the rectifier bridge are not destroyed.

It is also particularly advantageous that an erroneous fault recognition and an incorrect switching to operation by the additional regulator can be largely prevented, since both monitoring of voltage for unallowed voltage levels and monitoring by the logic circuit means are performed so that a fault indication occurs only when both the voltage monitoring and the logic circuit means monitoring cooperate to indicate the presence of a fault.

The means for fault detection and for protecting against overvoltages comprises a protective circuit means connected to the generator and the main voltage regulator means.

The means for fault detection advantageously includes means for detecting a conduction defect in the main voltage regulator means and means for detecting an interruption in the excitation circuit of the generator. The means for fault indication include means for signalling a detected conduction defect in the main voltage regulator means and means for signalling a detected interruption of the excitation circuit.

In a preferred embodiment of the invention the means for fault detection includes means for determining whether a voltage supplied by the generator exceeds a supplied voltage threshold value so as to detect a fully excited condition of the generator and means for determining whether the main voltage regulator means has been turned on longer than a predetermined time interval to indicate continuous operation of the main voltage regulator means. The logic circuitry includes means for determining whether simultaneously both the supplied voltage of the generator exceeds the supplied voltage threshold value and the main voltage regulator means is turned on longer than the predetermined time interval.

Also advantageously the means for detecting the interruption in the excitation current includes means for determining if a battery voltage drops below a battery voltage threshold value, means for testing whether a D+ terminal voltage exceeds a terminal voltage threshold value when a load is applied to a field winding of the generator and logic means for detecting when both the terminal voltage exceeds the terminal voltage threshold value when the field winding is under the load and the battery voltage drops below the battery voltage threshold value so as to detect interruption in the excitation current.

BRIEF DESCRIPTION OF THE DRAWING

The objects, features and advantages of the present invention will now be illustrated in more detail by the following detailed description, reference being made to the accompanying drawing in which.

DESCRIPTION OF THE PREFERRED EMBODIMENTS

Figure 1:
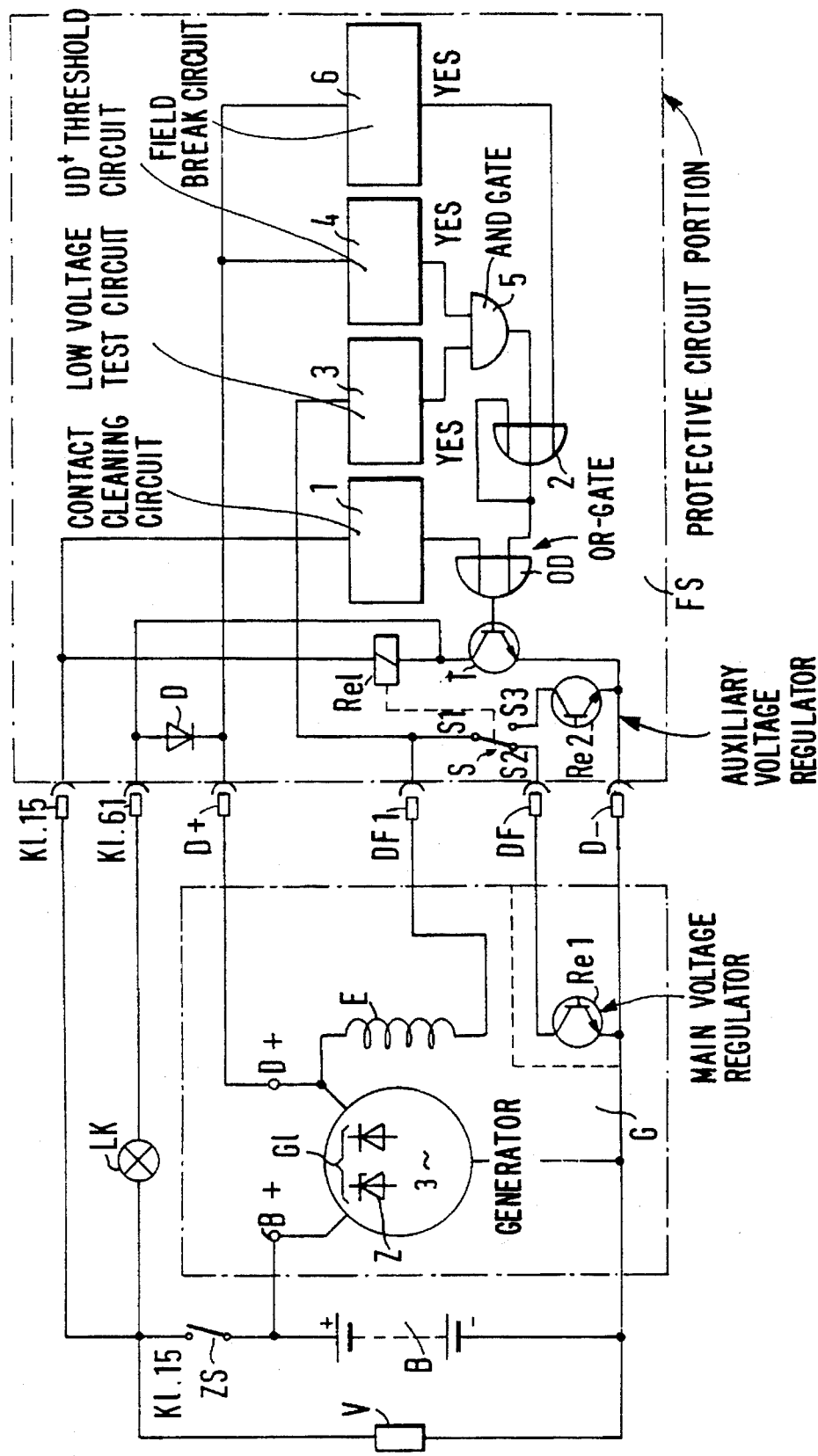
FIG. 1 is a schematic diagram of a battery charging apparatus.

The battery charging system is shown diagrammatically in FIG. 1. The generator G includes an excitation coil E and the rectifier bridge G1 comprising at least one Zener diode Z.

Terminal D+, the output of the excitation coil E, and B+ of the generator G are shown in FIG. 1. The terminal B+ is connected both with the positive pole of the battery and also with one side of the ignition switch ZS. The side of the ignition switch ZS not directly connected to the terminal B+ is connected with the consuming device V and the charge control lamp LK.

The main voltage regulator Re1 controls the output voltage of the generator and is symbolically represented here only by the symbol for a transistor. The generator G and the main voltage regulator Re1 and the charge control lamp LK and the consuming device V are connected by the terminals Kl.15, Kl.61, D+, DF1, DF, D– with protective circuit portion FS indicated in FIG. 1. The protective circuit portion FS of the battery charging apparatus is a means for protecting the device against subsequent damage.

The protective circuit portion FS includes a circuit, which has the following essential element: a diode, D, which is connected between the terminals Kl.61 and D+. Furthermore a relay Re1 is present in circuit portion FS, which connects DF1 and DF or DF1 and the additional or auxiliary voltage regulator Re2 alternatively via its switch portion S with contacts S1, S2 and S3 which it controls.

The relay Rel connects with a terminal Kl.15. A connection to terminal Kl.61 is present between the relay Rel and the transistor T.

A circuit portion 1 is shown in FIG. 1 and is a contact cleaning circuit means. This contact cleaning circuit portion 1 is connected to terminal Kl.15 on one side and on the other side by an OR- gate OD to the base of transistor T. The low voltage test circuit portion 3 tests whether the voltage at the terminal DF is low. The UD+ threshold voltage test circuit portion 4 tests whether the voltage UD$^+$ at the terminal D$^+$ is larger than a maximum value.

The outputs of circuit portions 3 and 4 are connected to an AND-gate 5, which for its part is connected by a logical unit 2 (OR-gate) to the OR-gate OD, which is connected with the contact cleaning circuit portion 1 and/or which is part of the contact cleaning means.

Circuit portion 6 tests whether the generator field circuit is interrupted. The field test circuit portion 6 is connected with the terminal D+ and the cathode of the diode D. The output of the field test circuit portion 6 is connected to the logic circuit portion 2.

The protective circuit portion FS thus performs the following functions: switching between regulators; interconnecting, contact cleaning, detection of complete excitation, detection of field interruption and voltage regulation by the main or first voltage regulator means. How the individual circuit portions or blocks are constructed is shown in detail in FIG. 2 and described in the associated description.

Figure 2:
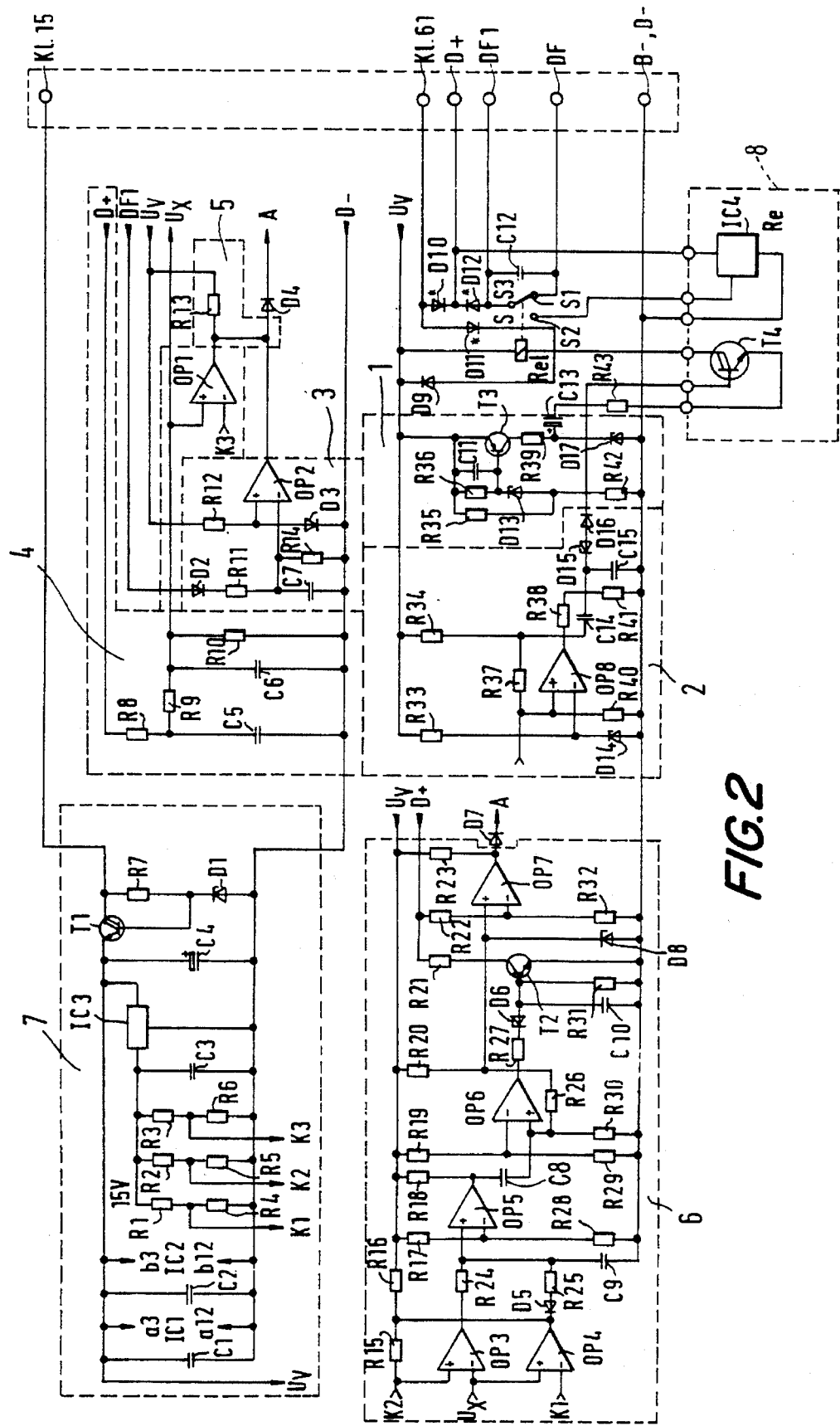
FIG. 2 is a circuit diagram of one embodiment of a portion of the battery charging apparatus devoted to fault detection and emergency regulation.

The supply circuit portion 7 shown in FIG. 2 includes means for supply of voltage to the eight operational amplifiers including IC1 and IC2, means for forming a reference voltage and means for limiting the voltage. The transistor T1, the diode D1 and the resistance R7 form a protective portion of the entire circuit which protects against voltage peaks or spikes, which can arrive in the circuit via Kl.15 from the power supply network. The supply voltage thus guaranteed is supplied further as U$_v$ to the entire circuit.

The resistances R1 to R6, which are connected by an additional integrated circuit IC3 similarly with the transistor T1, form together with the capacitors C3 and C4 the section of the supply circuit portion 7 which supplies the reference voltage, i.e. means for supplying the reference voltage. Between the resistances R1 and R4, the resistances R2 and R5 and the resistances R3 and R6 the respective terminals K1, K2 and K3 are connected. The reference voltages U$_{K1}$, U$_{K2}$ and U$_{K3}$ are supplied at the respective terminals K1, K2 and K3.

The transistor T1 and the series circuit branch consisting of the resistance R7 and the Zener diode D1, which is connected across the terminals Kl.15 and D– and/or B–, are provided to limit the voltage.

The circuit block or portion 7 is connected to the UD+ voltage test circuit 4, which includes an actual value filter and/or a voltage divider. Thus a series circuit branch including a resistor R8 and a capacitor C5 is connected between the terminals D+ and D–. One end of a resistance R9 is connected to this series circuit branch between the resistance R8 and the capacitor C5, whose other end is connected by the terminal D–, B– by a capacitor C6 and also by a resistance R10 connected in series with the capacitor C6. The resistance R9 is connected also with the noninverting input of an operational amplifier OP1 acting as a comparator. The voltage U$_x$ appears at this input of the operational amplifier.

The voltage U$_x$ is compared with a voltage U$_{K3}$ which is supplied to another input of the operational amplifier OP1 and which is produced in the circuit portion 7.

The output of the operational amplifier OP1 is connected to the supply voltage U$_v$ via a resistance R13. The circuit section 5 is formed by resistance R13 and a connection between the output of the operational amplifier OP1 and the resistance R13 and an additional operational amplifier OP2.

Low voltage test circuit portion 3 performs the so-called DF analysis. In this circuit section a series circuit branch including a diode D2, a resistance R11 and a capacitor C7 is connected between the terminal DF1 and D–. The resistance R14 is connected in parallel to the capacitor C7. The connection point between the resistance R11 and R14 and/or C7 is connected with the inverting input of the operational amplifier OP2. This noninverting input is connected with the connection point between a resistance R12 and a diode D3 which are connected in series between U$_v$ and D–. The output of the operational amplifier OP2, which is directly connected with the output of the operational amplifier OP1, as already mentioned, leads via a diode D4 to the output A.

The field break test circuit portion 6 of the protective circuit portion FS shown in FIG. 2 includes from left to right as shown in the figure a measurement window circuit section, a time delay circuit section, a pulse generator section, a load section and an evaluating circuit section.

In detail field break test circuit portion 6 includes two operational amplifiers OP3 and OP4. The operational amplifier OP3 is connected with its noninverting input to terminal K2 at which there is a voltage U$_{K2}$. The inverting input of the operational amplifier OP3 similarly is connected to the noninverting input of the operational amplifier OP4 at which the voltage U$_x$ is applied. The inverting input of the operational amplifier OP4 is connected to the terminal K1, to which the voltage U$_{K1}$ is applied.

The outputs of both operational amplifiers OP3 and OP4 are connected with each other. They are also both connected by the resistance R15 with the terminal K2 and/or the noninverting input of the operational amplifier OP3. Further both outputs of the operational amplifiers OP3 and OP4 are connected to U$_v$ via the resistance R16.

The noninverting input of an additional operational amplifier OP5 is connected with the output of the operational amplifier OP3 via the resistance R24 and with the output of the operational amplifier OP4 by the resistance R25 and the diode D5 and with the terminal B− and D− via the capacitor C9.

The inverting input of the operational amplifier OP5 is connected across the line at $U_y$ and the line to terminal B−, D− via the voltage divider R17, R28, the output of the operational amplifiers OP5 is connected by the resistance R18 to the line at the voltage $U_y$.

The inverting input of the operational amplifier OP6 is connected between the line at $U_y$ and the B−, D− terminal via the voltage divider R19, R29, its noninverting input being connected by the capacitor C8 with the output of the operational amplifier OP5. The noninverting input of the operational amplifier OP6 is connected by the resistance R30 with the terminal B−, D− and by the resistance R26 and the resistance R20 with the line at $U_y$. The operational amplifier OP6 with its circuit forms a pulse generator.

The output of the operational amplifier OP6 is connected by a resistance R27 and Zener diode D6 with a base of the transistor T2, whose collector is connected to a line at D+ via the resistor R21 and whose emitter is connected to the terminal at B−, D−. Capacitor C10 and resistor R31 are connected in parallel between the base of the transistor T2 and the terminals at B−, D−. This circuit section produces a load at the terminal D+.

The output of the operational amplifier OP6 is also connected with the noninverting input of the operational amplifier OP7. A Zener diode D8 is connected between the noninverting input of amplifier OP7 and the line to the terminal at B−, D−.

The inverting input of the operational amplifier OP7 is connected to the voltage divider including resistances R22 and R32, which is connected across the terminal D+ and the terminal B−, D−. The inverting input specifically is connected between the resistances R22 and R32. The output of the operational amplifier OP7 is connected to the line at $U_y$ via the resistor R23. The output signal A is delivered from diode D7 which is connected to the output of operational amplifier OP7. The operational amplifier OP7 together with the associated circuit section performs the actual evaluation.

The output signal A, which is supplied by the circuit portions 3 and/or 5 and/or 6, is fed to the OR-gate circuit 2 which is used to help provide a start up or shut down.

In particular the OR gate circuit 2 includes an operational amplifier OP8, to whose noninverting input is the output signal A is fed and whose inverting input is connected by the resistance R33 to the line at $U_y$ and by the Zener diode D14 to the terminal B− and/or D−. The output of the operational amplifier OP8 is fed back to the noninverting input by the resistor R37, a resistor R40 being connected between the noninverting input and the terminal B−, D−.

The output of the operational amplifier OP8 is moreover connected by a resistor R34 with the line at $U_y$ and with terminal B−, D− by a series circuit branch including the resistances R38 and R41.

A capacitor C14 is connected in parallel across the resistance R38 and a capacitor C15 is connected in parallel across the resistance R41. The common connection point between these components is connected via the diodes D15 and D16, which are connected in series opposing each other, with the contacting cleaning circuit portion 1.

The contact cleaning circuit portion 1, which acts to separate the contacts, includes a transistor T3, whose emitter is connected to the line at $U_y$. The capacitor C11 and the resistance R36 connected in parallel to the capacitor C11 are connected across the emitter and the base of transistor T3. The base of the transistor T3 is also connected by the Zener diode D13 and the resistance R42 with the terminal D−. The resistance R35 is connected in parallel to the resistance R36 and to the Zener diode D13.

The collector of the transistor T3 is connected by the resistance R39 and the Zener diode D17 with terminal D−. A capacitor C13 and a resistance R43 are connected in parallel to the Zener diode D17. The connection point between the capacitor C13 and the resistance R43 is connected on one side with the cathode of the diode D16 and on the other side to the base of the transistor T4, which is the final stage component and whose emitter is connected with the other side of the resistance R43 and/or terminal D−.

The collector of the transistor T4 is connected with the controlling terminal of the relay Rel. The other side of the relay Rel is connected to the line at $U_y$, and the diode D9 is connected in parallel across the relay Rel.

A diode D11 connects the terminal Kl.61 to a connection between the relay rel (or S) and the transistor T4. An additional connection is made between the terminal Kl.61 and the switch terminal S3 of the relay Rel by the diode D10 and diode D12 connected in series with each other. The connection point between the diodes D10 and D12 is connected to the terminal D+. The anode of diode D12 is connected to the terminal DF1. A capacitor C12 is connected across the switch contacts S3, S1 of the relay Rel. An integrated circuit IC4 is connected between the switch contact or point S2, the terminal D+ and the terminal D−. The integrated circuits IC4 is a full value voltage regulator. It is connected by the relay Rel, which is controlled by the transistor T4.

The transistor T4 and the regulator IC4 are enclosed by a housing and arranged on a cooling plate. The terminals Kl.15, Kl.61, D+, DF1, DF, B− and D− are usually located in a common connector plug.

The apparatus and its circuit means described in detail in FIG. 2 and schematically in FIG. 1 monitors the voltage at the terminal D+ and reroutes the field current from the defective regulator Rel to the replacement or substitute regulator Re2 in the case of a fault. For that the connection field winding regulator Rel is interrupted in the brush holder and fed to the plug DF1, DF. The circuit is connected with the generator terminals D+, DF1, DF and D− and also to the terminals Kl.15 and Kl.61.

The excitation current flows from the terminal Kl.15 via the charge control lamp into the circuit arrangement and/or protective circuit portion FS and from there by a diode through the field winding, further via the relay rest contact and the regulator Rel.

The operation of the circuit is shown in FIG. 2:

The supply circuit portion 7 of the protective circuit portion FS is shown in FIG. 2. The energy is supplied via the terminal Kl.15. Eventually occurring voltage peaks or spikes are reduced by the transistor T1, the diodes D1 and the resistance R7 to the maximum allowed supply voltage $U_y$. The integrated low voltage test circuit 3 produces a constant voltage of 15 volts, from which the reference voltages $U_{K1}$ to $U_{K3}$ are formed.

The occurrence of full excitation is detected in the circuit portions 3, 4 and 5. The voltage to be monitored at $D^+$ is smoothed with the capacitors C5 and C6 and divided by the resistors R8 to R10 to a third of its value. The measured voltage is $U_x$. If $U_x$ is larger than $U_{K3}$, the comparator OP1 shuts off or blocks its output.

The square wave signal at terminal DF1 with a key ratio>0, charges the capacitor C7. If this signal is at a low level for a long time, about 10 millisecond indicates complete excitation, then the voltage at capacitor C7 drops below the conducting voltage level of the diode D3 and the comparator OP2 shuts off or blocks its output.

When both comparators OP1 and OP2 are at a high-level, the fault case "regulator conduction defect" is detected, so that then the signal A also goes to a high-level. One condition alone however still does not result in the recognition of a fault and the setting of the signal A to a high-level. This is guaranteed by the and-gate linkage.

The field break circuit 6 detects the presence of an interruption of the excitation field. If the measured voltage $U_x$ is less than the voltage $U_{K2}$ because of an interruption in the excitation, but still larger than $U_{K1}$(threshold 1), thus both comparators OP3 and OP4 go to a high-level. The capacitor C9 is charged via the resistances R16 and R24.

If this initial condition is no longer fulfilled, the capacitor C9 discharges through the diode D5 and the resistance R25. Should the voltage at the capacitor C9 exceed the value at the voltage divider R17/R28, the comparator OP5 goes to a high-level. A current flows from the resistance R18 to the resistance R30 through the capacitor C8 and of course until the capacitor C8 is charged(high-pass).

During this time the comparator OP6 is at a high-level. The transistor T2 is then controlled via the resistance R27 and the diode D6.

No current flows from the terminal D+ when the excitation is interrupted. Then the potential of the terminal Kl.15 is applied to the terminal D+ via the charge control lamp LK. If the transistor T2 is conducting, the voltage UD+ is at the value of the voltage divider branch formed by the charge control lamp LK and the resistance 21 and drops under the Zener potential of the diode D8 (threshold 2) via the voltage divider R22, R32. The comparator OP7 and thus also the signal A goes because of that to a high-level.

The regulator switching and the contact cleaning is performed by the circuit portions 1, 2 and 8. If the signal A is at a high-level, the voltage at the resistance R40 is larger than the Zener voltage of the diode D14. The comparator OP8 then goes similarly to a high-level and maintains the voltage at the resistance R40 via the resistance R37. This condition remains, also when the signal A again goes to a low-level(fault blocking).

The transistor T4 is controlled by the diodes D15, D16, which put the relay S on and switch the field current control to the integrated circuit IC4, which acts as the additional or auxiliary voltage regulator Re2. Simultaneously the charge control lamp LK is grounded through the diode D11 so that a fault signal is produced.

The oxidation of the contact surfaces at S1 and S2 of the relay S increases the resistance in the excitation circuit and can lead in the extreme case to interruption of the circuit. Thus when the ignition is turned on, the relay S is switched once back and forth via the transistor T4, so that a contact cleaning occurs.

On switching the voltage $U_y$ increases, so the transistor T3 controls via the diode D13 and the resistance R42 and a base current flows to the transistor T4 via the resistance R39 and the capacitor C13. When the capacitor C13 is charged, no such current flows any longer.

Figures 1, 4A:
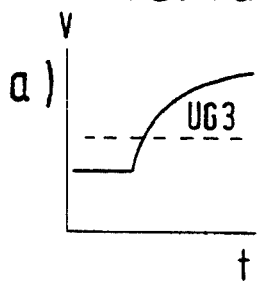
Figures 2, 4A:
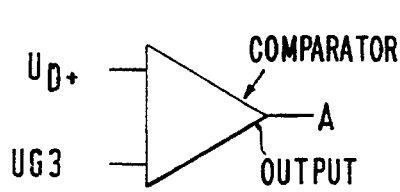
Figures 3, 4A:
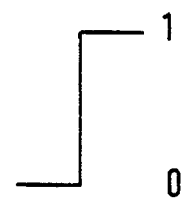
FIGS. 3 a), 3b, 3 c) and 4 a), 4 b) and 4c) are schematic diagrams of a few circuit elements and graphical illustrations of the relationship of voltage and time in these circuit elements which are designed to illustrate the operating principles of the apparatus of the invention.
Figures 1, 4B:
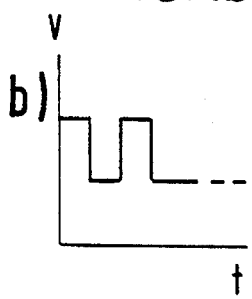
Figures 2, 4B:
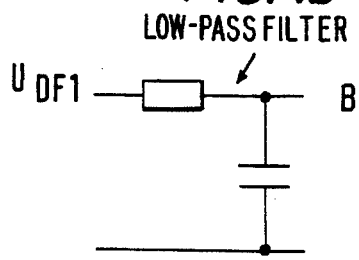
Figures 3, 4B:
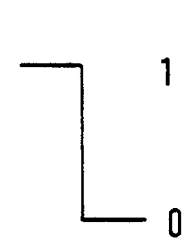

The measurement principle for detection of the field interruption and/or the full excitation is illustrated now with the aid of FIGS. 3 and 4. In the case of the field interruption the generator is de-excited. When the battery voltage falls below the limiting value $U_{G1}$=25 volts, the terminal D+ is at a battery potential above the charge control lamp LK(FIG. 3a). After a waiting time t1 of for example 0.5 seconds, a load occurs at D+ with a resistance having a value $R_x$. The duration of the load should be t2 and amounts to for example 0.5 seconds. The adjusted voltage then becomes:

$$U_{D+}=(U_{B+}*R_x)/(R_x+R_L),$$

where RL is the resistance of the lamp (see FIG. 3b).

If the voltage at terminal D+ is under a limiting value of $U_{G2}$=12 volts, then a switching and blocking occurs on emergency regulation. The indication of emergency operation occurs simultaneously. The entire response time amounts to about 1 second (FIG. 3b).

The time dependence of the voltage signals is shown in FIG. 3c. The uppermost voltage-time curve in FIG. 3c shows the course of the voltage UD+ at D+ with both thresholds $U_{G1}$=25 V and $U_{G2=12}$ V. The voltage-time curve immediately below the uppermost one in FIG. 3c shows the detection of an under-voltage, indeed, when the signal is high. The middle voltage-time curve shows the load pulse. The voltage-time curve immediately below the middle voltage-time curve shows the relay control. The lowest voltage-time curve is the signal at DF.

The vertical dashed lines L1 to L5 in FIG. 3c bound different operating time intervals. A field interruption occurs at L1. At L2 the first threshold $U_{G1}$ is passed, after t1 the load pulse of length t2 results. At L4 the threshold $U_{G2}$ is passed (voltage falls below this threshold). The circuit switches after the time corresponding to the dashed line L5 and emergency operation begins under control of the additional voltage regulator Re2.

For detection of the full excitation (FIG. 4) whether the power supply voltage falls below the threshold value of $U_{G3}$=32 volts is tested as a first test condition. The voltage $U_{D+}$ is applied at the input of a comparator, at whose other input the threshold voltage is applied. The output of the comparator is according to the voltage comparison at a high or low value (FIG. 4a).

Whether the regulator is continuously turned on is tested as a second test condition. A switched-on time limit of t>10 milliseconds is selected to determine what constitutes "continuously turned on". Depending on the results of this test which occurs with the help of a low-pass filter, a high- or low- potential (FIG. 4a and 4b) arises at the output of the low-pass filter. Only when condition 1 and condition 2 are fulfilled, a switching on and blocking in emergency regulation occurs and an indication of the emergency operation also is provided. The response time amounts to about 3 milliseconds.

Figure 4C:
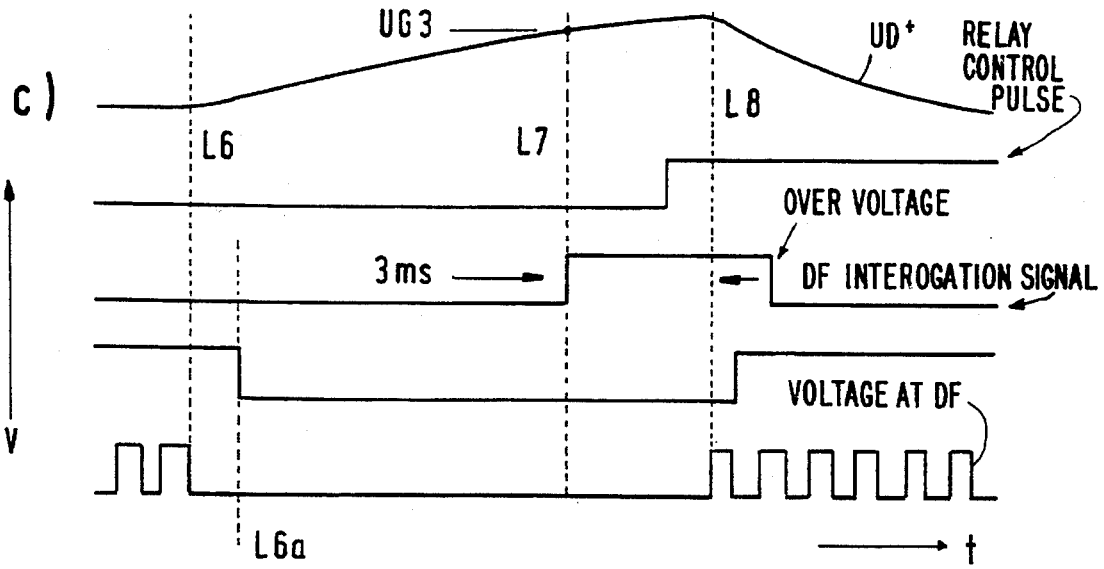

The time course for detection of full excitation is shown in FIG. 4c. The voltage-time curves are from the top of FIG. 4 to the bottom as follows: voltage UD+ at terminal D+ versus time with the threshold $U_{G3}$; relay control voltage; overvoltage, signal at A is high in an overvoltage; DF-question(signal at B); and signal at terminal DF.

In FIG. 4c the following events occur: the voltage regulator Rel is conducting at the time corresponding to dashed line L6. The defect is detected at the line L6a. An overvoltage is detected at dashed line L7 after the voltage UD+ exceeds a threshold and the apparatus switches at dashed line L8 so that an emergency operation occurs under control of the additional regulator Re2.

The excitation circuit of the generator comprises the excitation winding or coil and its connections in the generator.

It will be understood that each of the elements described above, or two or more together, may also find a useful application in other types of constructions differing from the types described above.

While the invention has been illustrated and described as embodied in a battery charging apparatus with fault detection, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims.

We claim:

1. A battery charging apparatus comprising a generator (G) having an excitation circuit and two terminals (B+, D−) for connection of at least one battery to be charged and another terminal (D+) for at least one consuming device; rectifier means connected with said generator for rectifying an output current of the generator; main voltage regulator means for controlling a generator output voltage, means for fault detection, means for fault indication including a charge control lamp, and means for protecting against overvoltages;

wherein said means for fault detection and means for protecting against overvoltages are included in circuit means electrically connected to said generator and said main voltage regulator means;

wherein said means for fault detection includes means for comparing a voltage to a voltage threshold value to produce a comparison result indicating when said voltage exceeds said voltage threshold value and logic circuit means for signalling occurrence of a fault only when said voltage exceeds said voltage threshold value, said logic circuit means including logic circuit components;

wherein said means for fault detection includes means for detecting a conduction defect in said main voltage regulator means and means for detecting an interruption of said excitation circuit of said generator, and said means for fault indication includes means for signalling when both the conduction defect in said main voltage regulator means and the interruption of said excitation circuit occurs are detected;

wherein said means for fault detection includes means for determining whether a voltage supplied by said generator exceeds a supplied voltage threshold value so as to detect a fully excited condition of said generator and means for determining whether said main voltage regulator means has been turned on longer than a predetermined time interval to indicate continuous operation of said main voltage regulator means, and wherein said logic circuit means includes means for determining whether simultaneously both said voltage supplied by said generator exceeds said supplied voltage threshold value and said main voltage regulator means is turned on longer than said predetermined time interval.

2. The battery charging apparatus as defined in claim 1, wherein said circuit means including said means for fault detection and said means for protecting against overvoltages is a protective circuit portion (FS).

3. The battery charging apparatus as defined in claim 1, wherein said rectifier means includes rectifier bridges, at least one of said rectifier bridges including Zener diodes.

4. A battery charging apparatus comprising a generator (G) having an excitation circuit and two terminals (B+, D−) for connection of at least one battery to be charged and another terminal (D+) for at least one consuming device; rectifier means connected with said generator for rectifying an output current of the generator; main voltage regulator means for controlling a generator output voltage, means for fault detection, means for fault indication including a charge control lamp, and means for protecting against overvoltages;

wherein said means for fault detection and means for protecting against overvoltages are included in circuit means electrically connected to said generator and said main voltage regulator means;

wherein said means for fault detection includes means for comparing a voltage to a voltage threshold value to produce a comparison result indicating when said voltage exceeds said voltage threshold value and logic circuit means for signalling occurrence of a fault only when said voltage exceeds said voltage threshold value, said logic circuit means including logic circuit components;

wherein said means for fault detection includes means for detecting a conduction defect in said main voltage regulator means and means for detecting an interruption of said excitation circuit of said generator, and said means for fault indication includes means for signalling when both the conduction defect in said main voltage regulator means and the interruption of said excitation circuit are detected;

wherein said means for detecting said interruption of said excitation current includes means for determining if a battery voltage drops below a battery voltage threshold value, means for testing whether a voltage (UD+) at said terminal (D+) exceeds a terminal voltage threshold value when a load is applied to a field winding of the generator and logic means for detecting when both said voltage (UD+) exceeds said terminal voltage threshold value when said field winding is under said load and said battery voltage drops below said battery voltage threshold value so as to detect said interruption of said excitation current.

5. The battery charging apparatus as defined in claim 4, wherein said circuit means including said means for fault detection and said means for protecting against overvoltages is a protective circuit portion (FS).

6. The battery charging apparatus as defined in claim 4, wherein said rectifier means includes rectifier bridges, at least one of said rectifier bridges including Zener diodes.

\* \* \* \* \*